United States Patent [19]
Myers

[11] 3,723,863
[45] Mar. 27, 1973

[54] PORTABLE GROUND CONTINUITY TESTER

[76] Inventor: Raymond T. Myers, P.O. Box 2062, Fargo, N. Dak. 58102

[22] Filed: Jan. 3, 1972

[21] Appl. No.: 214,999

[52] U.S. Cl. .................................................324/51
[51] Int. Cl. ............................................G01r 31/02
[58] Field of Search ..................324/51, 53; 340/255

[56] References Cited

UNITED STATES PATENTS

| | | | |
|---|---|---|---|
| 1,736,605 | 11/1929 | Kreft | 324/51 |
| 2,511,918 | 6/1950 | Huff | 324/51 |
| 2,611,008 | 9/1952 | Wilcock et al. | 340/255 X |
| 3,103,808 | 9/1963 | Eichelberger | 324/51 X |
| 3,141,128 | 7/1964 | Behr | 324/51 |
| 3,214,689 | 10/1965 | Outen | 324/51 |

*Primary Examiner*—Gerard R. Strecker
*Attorney*—William E. Schuyler, Jr. et al.

[57] ABSTRACT

A portable ground continuity tester having a body formed of electrically conductive material and comprised of a base plate and an upstanding side wall with a handle extending therebetween. A battery is attached by a pair of terminals to the base plate and a box having a receptacle mounted therein is attached to the side wall. A test lead is attached at one end to the box and connected in series with an indicator light and the battery. A test probe on the other end of the test lead is used to contact an electrical device plugged in to the receptacle during testing whereby the light is illuminated when continuity exists.

6 Claims, 3 Drawing Figures

Patented March 27, 1973 3,723,863

PORTABLE GROUND CONTINUITY TESTER

BACKGROUND OF THE INVENTION

1. Field of the Invention

This invention relates generally to electrical testing apparatus and more particularly to an improved battery operated portable ground continuity tester for testing the ground continuity in electrical devices such as power tools and extension cords without exposing an operator to dangerous voltages.

2. Description of the Prior Art

In using various electrical devices, such as electrical hand tools, it is necessary to employ rather high voltages. Accordingly, it is important that the hand tool be properly grounded at all times to prevent danger of shock to the operator. Recent Federal safety laws have made it particularly important that suitable tester devices be available to test the ground continuity of various electrical devices.

Various prior art devices have heretofore been known for testing the continuity of various electrical devices, such as small hand operated power tools. Many such prior art devices, however, have been objectionable as being unduly complicated and expensive to manufacture. Other such devices have not been of a size which durable them conveniently portable while still being of rugged and durable construction. Still other such devices have been objectionable in that they are not battery operated but require a source of power such as 110 volts A.C., thus limiting their usefulness as well as making them potentially more dangerous to operate. Still other such prior art devices are difficult for an unskilled laborer to operate properly.

SUMMARY OF THE INVENTION

Among the objects of the present invention is to avoid the disadvantages of prior art continuity testers enumerated above. Another object of the present invention is to provide a portable ground continuity tester which is simple in construction but ruggedly built and safe to operate since it only requires a low voltage power source. A still further object is to provide a portable ground continuity tester which is easy and simple to operate.

According to the present invention, there is provided a portable ground continuity tester having a body formed of electrically conductive material and comprised of a base plate and a connected side wall upstanding therefrom. A handle is attached at one end to the base plate and at the other end to the side wall so as to leave a space between the base plate and the handle for gripping the tester. A battery having a pair of upstanding threaded terminals is attached to the base plate with one of the terminals being insulated therefrom and the other being in electrical contact therewith, while a receptacle box is attached to the side wall. A female receptacle is mounted in the box for receiving a male plug of an electrical device being tested. An indicator light is mounted in the box in series with said battery which is illuminated when ground continuity exists in the device being tested. A test lead is provided having a test probe at one end and the other end attached to the box and connected in series with the light and the battery whereby when an electrical device is plugged into the receptacle the probe may be placed in electrical contact with the electrical device to check the ground continuity therein.

BRIEF DESCRIPTION OF THE DRAWINGS

Other objects and advantages of the invention will become apparent by reference to the more detailed description of the invention in the accompanying drawings which follow wherein.

DESCRIPTION OF THE DRAWINGS

Figure 1:
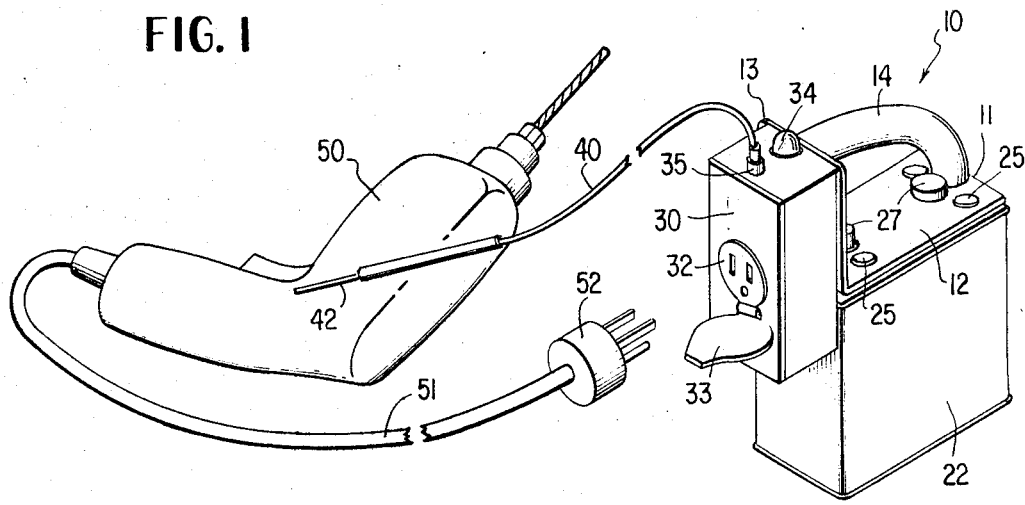
FIG. 1 is a perspective view of the tester of the present invention showing the manner in which it may be connected to an electrical hand tool such as an electrical drill.

Referring to the drawings, there is shown a ground continuity tester 10 comprised of a body portion 11 formed of a good electrically conductive material such as metal. Body portion 11 is comprised of a base plate 12 having an upstanding side wall 13 attached thereto. In the embodiment shown in the drawings, side wall 13 is perpendicular to base plate 12. A handle 14 is attached at its lower end to the outside end of base plate 12 and at its upper end to the upper end of side wall 13 by any suitable means, such as welding. In the embodiment shown in the drawings, handle 14 may be constructed of a rod which may be either hollow or solid or of a flat strip.

Base plate 12 is provided with a pair of spaced openings 20 and 21, with opening 20 being adjacent the front of the plate and the other opening 21 adjacent the rear or back of the plate. These openings are adapted to receive the threaded terminals of a battery 22. The battery employed is a standard two-terminal 6 volt D.C. lantern battery readily available from commercial suppliers or outlets.

Figure 2:
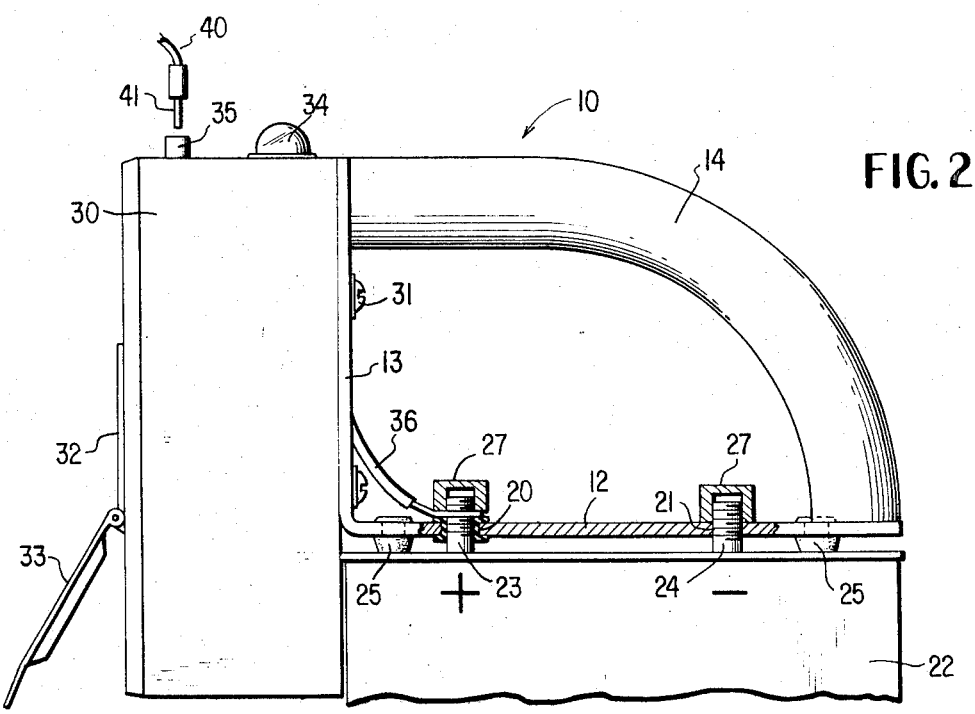
FIG. 2 is an enlarged side view, partly in section, of the upper portion of the tester of the present invention.

As shown in FIG. 2, the positive terminal 23 is received in front opening 20, while negative terminal 24 is received in opening 21. Opening 20 is further provided with an insulating grommet 25 to insulate the positive terminal 23 from the base plate 12. Grommet 25 may be of any suitable insulating material such as a vinyl plastic. It is to be noted that the negative terminal 24 is in direct electrical contact with the conductive material surrounding opening 21 of the base plate 12.

A plurality of rubber spacers 26 are attached to base plate 12 to space the top of the battery 22 from the base plate and to distribute the pressure therebetween. In the embodiment shown in the drawings, the rubber spacers 25 are attached to base plate 12 by being inserted into openings therein. The battery is secured to base plate 12 of body portion 11 by means of threaded caps 27 which are adapted to be threaded on to the threaded tops of the battery terminals 23 and 24.

Attached to side wall 13 and in electrical contact therewith is a receptacle box 30 formed of an electrically conductive material such as a suitable metal. In the embodiment shown in the drawings, the receptacle box 30 is attached to side wall 13 by means of screws 31 threaded into openings inside wall 13 and the back of receptacle box 30. The box is weatherproof so that it will not be harmed or affected in any way by exposure to the elements.

A female receptacle or outlet 32, adapted to receive a threepronged male plug, is mounted in the front wall of receptacle box 30. The receptacle 32 is protected by a snap cover plate or cap 33. When not in use, cover plate 33 is spring biased to a closed position covering receptacle 32. During use of outlet 32, however, the cover plate 33 may be pivoted downwardly to permit a plug to be inserted into the receptacle.

Mounted on the top of receptacle box 30 are an indicator light 34 and a socket 35. It will be understood that both the light and the socket may be mounted in another wall of the receptacle box, if desired. Light 34 and sockets 35 are connected by an insulated connecting wire 36 in series with the battery 22. As more clearly shown in FIG. 2, connecting wire 36 at its bottom end is connected to the positive terminal 23 of the battery and extends through an opening in wall 13 and another opening in the back of receptacle box 30 up to light 34 and socket 35 where the wire terminates.

A flexible test lead 40 is provided with a prong 41 at its inner end which is adapted to be detachably received in and make electrical contact with socket 35. The outer end of test lead 40 is provided with a test probe 42 which is adapted to contact an electrical device being tested. Alternatively, if desired, test lead 40 at its inner end may be permanently connected to socket 35 in outlet box 30.

In the drawings, the tester 10 of the present invention is shown ready for use with an electric hand drill 50 having a metal case and an electrical cord 51 with a three-pronged male plug 52 on the end thereof.

It will be readily apparent that to operate the tester of the present invention to test the ground wire to power tool case continuity in the electric drill 50, the plug 52 of the drill is merely inserted into receptacle 32 whereupon the probe 42 of test lead 40 is put in direct contact with the metal casing of the drill. If continuity exists between the ground prong of plug 52, the ground wire in cord 51 and the metal case of the drill 50, an electrical circuit will be completed to illuminate indicator light 34. On the other hand, if the light fails to come on, there is an indication that the ground circuit of the tool is open, thus indicating a defective tool which must be repaired.

Figure 3:
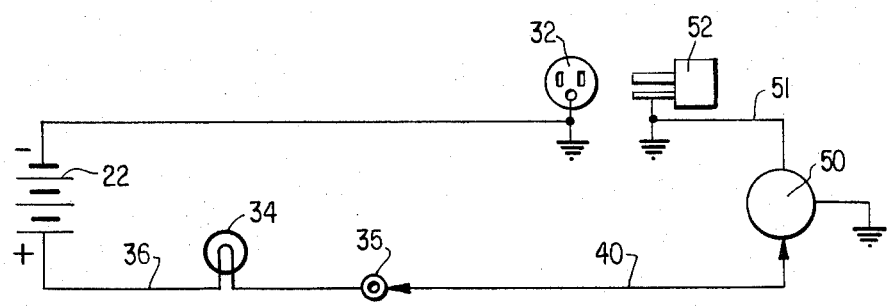
FIG. 3 is a schematic electrical circuit of a tester of the present invention when used with an electric device such as a power tool.

It will be apparent from the schematic wiring circuit diagram of FIG. 3 that the complete electrical circuit during testing goes from the positive terminal 23 of battery 22 through connecting wire 36 to light 34, socket 35, test lead 40, the metal casing of electric drill 50, to cord 51 through plug 52 to receptacle 32 which is in electrical contact with receptacle box 30. The circuit then passes through the electrical box 30 to side plate 13 and then through base plate 12 back to the negative terminal 24 which is in electrical contact with the base plate 12.

Handle 14, in addition to providing an easy means to grasp the power tool also is positioned over and directly above the terminals 23 and 24, thus affording a great deal of protection to the terminals and eliminating the possibility of the terminals being shorted and the battery accidentally discharging. If light 34 and socket 35 are mounted centrally in the back wall of box 30 to extend through plate 13, then handle 14 also functions to protect the light and the socket.

While the tester of the present invention is shown in the drawings for use with an electric power tool, it will be appreciated that the device also may be used to test an electric extension cord. To test such a cord, the plug end of the cord is plugged into receptacle 32 and probe 42 is inserted into the ground terminal of the other end of the extension cord to test the ground wire continuity in the cord. In order to check the tester of the present invention to see whether it is operating without connecting it to another electrical device, it is merely necessary to insert the probe 42 of test lead 40 into the ground terminal connection of receptacle 32. If the device is operational, indicator light 34 will be illuminated.

It will be apparent that the tester of the present invention affords many advantages. It is readily portable and extremely simple to operate since it is only necessary to insert the plug of an electrical device being tested into the receptacle and then complete the circuit by using the probe end of the flexible test lead to contact the electrical device. Thus, any unskilled operator can easily operate the tester. Moreover, it has a simple but rugged construction which is particularly suitable for use in areas such as the construction industry. Its durable construction makes it very difficult to damage. Moreover, its overall configuration is such that it would be difficult for a worker to intentionally or unintentionally pick up the device and leave a construction area with it without being noticed. The device is also desirable in that it does not require a high voltage to operate, thus eliminating any danger of injury to an operator. As previously noted, the battery is preferably a standard two-terminal, 6 volt D.C. lantern battery, readily available commercially and which will provide many hours of testing.

Although the present invention has been illustrated and described with reference to a specific embodiment, it will be understood that various modifications may be made by persons skilled in the art without departing from the spirit of the invention which is defined solely by the appended claims.

I claim:

1. A portable ground continuity tester comprising
   a body formed of an electrically conductive material, said body comprising at least one base plate and an upstanding side wall,
   a handle attached at one end to said base plate and at the other end to said side wall,
   a battery having a pair of upstanding terminals attached to said base plate with one of said terminals being in electrical contact therewith and the other of said terminals being insulated therefrom,
   a receptacle box formed of an electrically conducting material attached to said side wall in electrical contact therewith,
   a female receptacle mounted in said box in electrical contact therewith for receiving a male plug of an electrical device being tested,
   an indicator light mounted in said box and insulated therefrom and connected in series with said battery, and
   a test lead having a test probe at one end and the other end attached to said box and insulated therefrom and connected in series with said light and said battery whereby when said electrical device is plugged into said receptacle and said probe is placed in electrical contact with said electrical device, said light is illuminated when continuity exists in the circuit thus formed.

2. A portable ground continuity tester as defined in claim 1 wherein said terminals are threaded and extend through a pair of openings in said base plate, an insulating grommet is provided in one of said holes to insulate one of said terminals from said base plate, and a cap is threaded on to each terminal to secure said battery to said base plate.

3. A portable ground continuity tester as defined in claim 1 wherein said handle is positioned above and directly over said terminals.

4. A portable ground continuity tester as defined in claim 1 wherein said other end of said test lead is provided with a prong and a socket is mounted in said box for detachably receiving said prong.

5. A portable ground continuity tester as defined in claim 1 which includes a cover plate mounted on said box for protecting said receptacle when not in use.

6. A portable ground continuity tester as defined in claim 1 which includes a plurality of rubber spacers between said base plate and said battery.

* * * * *